United States Patent
Ochi et al.

(10) Patent No.: US 9,817,621 B2
(45) Date of Patent: Nov. 14, 2017

(54) IMAGE FORMING APPARATUS AND IMAGE FORMING SYSTEM

(71) Applicant: Oki Data Corporation, Tokyo (JP)

(72) Inventors: Kengo Ochi, Tokyo (JP); Shota Kosuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/831,856

(22) Filed: Aug. 20, 2015

(65) Prior Publication Data

US 2016/0179447 A1   Jun. 23, 2016

(30) Foreign Application Priority Data

Dec. 19, 2014   (JP) .................. 2014-257074

(51) Int. Cl.
  *G06K 15/00*   (2006.01)
  *G06F 3/12*    (2006.01)

(52) U.S. Cl.
  CPC ............ *G06F 3/1259* (2013.01); *G06F 3/121* (2013.01); *G06F 3/1234* (2013.01); *G06F 3/1288* (2013.01); *G06F 3/1292* (2013.01)

(58) Field of Classification Search
  None
  See application file for complete search history.

(56) References Cited

U.S. PATENT DOCUMENTS

| | | | | |
|---|---|---|---|---|
| 2011/0137778 A1* | 6/2011 | Kurihara | ............... | G06Q 30/04 705/34 |
| 2011/0200364 A1* | 8/2011 | Fukui | .................. | G03G 15/502 399/258 |
| 2013/0016377 A1* | 1/2013 | Meiyappan | ............. | G06F 3/121 358/1.9 |

FOREIGN PATENT DOCUMENTS

JP   2013-012053 A   1/2013

* cited by examiner

*Primary Examiner* — Dov Popovici
(74) *Attorney, Agent, or Firm* — Rabin & Berdo, P.C.

(57) ABSTRACT

In order to make it possible to recognize the status in which job processing is disabled, by checking a job queue; printer 110 includes print-job obtaining unit 114 that obtains print job from a cloud server, image forming related unit 113 that is involved in image forming according to the print job obtained by print-job obtaining unit 114, and monitoring unit 115 that monitors a status of image forming related unit 113 and notifies the cloud server of status information on the status of image forming related unit 113, as information indicating a status of the print job obtained by print-job obtaining unit 114.

6 Claims, 19 Drawing Sheets

FIG. 3

| ORDER | STATUS | TYPE | DOCUMENT NAME | JOB ID |
|---|---|---|---|---|
| 1 | CURRENTLY PRINTED | PC PRINT | Chart.xls | print1 |
| 2 | WAITING TO BE PRINTED | CLOUD PRINT | Order.doc | printer1-1 |
| 3 | WAITING TO BE PRINTED | CLOUD PRINT | Photo.jpeg | printer1-2 |
| 4 | WAITING TO BE PRINTED | PC PRINT | Bill.pdf | print2 |

```
{
 "succes" : true,
 "jobs" : [
  {
   "job_id" : "printer1-1",
   "status" : "QUEUED",
   "fileUrl" : "http://print.cloud.com/printer1_example_com/order.pdf"
  }
 ]
}
```

FIG. 11

```
{
  "printer_id" : "printer1_example_com",
  "semantic_state" : [
  {
    "version" : "1.0",
    "printer" : {
      "state" : "STOPPED",
      "marker_state" : {
        "item" : [
        {
          "vendor_id" : "black",
          "state" : "EXHAUSTED"
          "level_percent" : 0
        },
        ]
      }
    }
  }
  ]
}
```

FIG. 12

```
{
  "success" : true,
  "message" : "Printer updated successfully.",
}
```

FIG. 14

| ORDER | STATUS | TYPE | DOCUMENT NAME | JOB ID |
|---|---|---|---|---|
| 1 | STOPPED | PC PRINT | Chart.xls | print1 |
| 2 | WAITING TO BE PRINTED | CLOUD PRINT | Order.doc | printer1-1 |
| 3 | WAITING TO BE PRINTED | CLOUD PRINT | Photo.jpeg | printer1-2 |
| 4 | WAITING TO BE PRINTED | PC PRINT | Bill.pdf | print2 |

| 180a | 180b | 180c |
| --- | --- | --- |
| PRINTER ID | PRINTER NAME | STATUS |
| printer1_example_com | printer1.example.com | STOPPED (NO TONER) |
| ⋮ | ⋮ | ⋮ |

FIG. 17

```
{
 {
  "jobid" : "printer1-1",
  "semantic_state" : [
   {
    "type" : "STOPPED",
    "device_state_cause" : {"error_code" : "MARKER"}
   }
  ]
 }
 {
  "jobid" : "printer1-2",
  "semantic_state" : [
   {
    "type" : "STOPPED",
    "device_state_cause" : {"error_code" : "MARKER"}
   }
  ]
 }
}
```

FIG. 18

| NO | STATUS | JOB ID | NAME | URL |
|---|---|---|---|---|
| 1 | STOPPED(TONER) | printer1-1 | Order.doc | http://print.cloud.com/printer1_example_com/order.pdf |
| 2 | STOPPED(TONER) | printer1-2 | Photo.jpeg | http://print.cloud.com/printer1_example_com/photo.jpeg |

FIG. 19

```
{
 "success" : true,
 "message" : "Job updated successfully.",
}
```

IMAGE FORMING APPARATUS AND IMAGE FORMING SYSTEM

BACKGROUND OF THE INVENTION

1. Field of the Invention

The present invention relates to an image forming apparatus and an image forming system, in particular, an image forming apparatus and an image forming system with a function of image forming through a server.

2. Description of the Related Art

There is a conventional printer which carries out printing according to print jobs downloaded from servers, as is described in Japanese Patent Application Publication No. 2013-12053, for example.

When an error (such as a paper jam) occurs during execution of a job, the conventional printer displays error information on the operation panel.

SUMMARY OF THE INVENTION

However, when a job which is downloaded from a server is waiting in the printer, if an error (such as a paper jam) occurs during execution of another job, the conventional printer does not notify the server of the occurrence of the error as the status of the waiting job. Therefore, a user who executes the operation of sending a print job to the server cannot recognize the state in which processing of the job is disabled because of the error in the printer, even if the user checks a job queue managed in the server. This is a problem of the conventional printer.

The purpose of the present invention is to make it possible to recognize the status in which job processing is disabled, by checking a job queue.

According to an aspect of the present invention, there is provided an image forming apparatus including an obtaining unit that obtains image forming data from a cloud server, an image forming related unit that is involved in image forming according to the image forming data obtained by the obtaining unit, and a monitoring unit that monitors a status of the image forming related unit and notifies the cloud server of status information on the status of the image forming related unit, as information indicating a status of the image forming data obtained by the obtaining unit.

According to another aspect of the present invention, there is provided an image forming apparatus including comprising: an obtaining unit that obtains image forming data, a storing unit that stores a plurality of image forming data obtained by the obtaining unit, an image forming related unit that is involved in image forming according to each of the plurality of image forming data stored in storing unit, and a monitoring unit that notifies a cloud server, when an error occurs during execution of image forming according to processing-target image forming data by the image forming related unit, of status information indicating a status which is same as a status of the processing-target image forming data after the error occurs, as information indicating a status of image forming data which are obtained by the obtaining unit from the cloud server and of which image forming is performed after the image forming according to the processing-target image forming data.

According to another aspect of the present invention, there is provided an image forming system including an image forming apparatus and a cloud server. The image forming apparatus includes an obtaining unit that obtains image forming data from the cloud server, an image forming related unit that is involved in image forming according to each of the plurality of image forming data stored in storing unit, and a monitoring unit that monitors a status of the image forming related unit and notifies the cloud server of status information on the status of the image forming related unit as information indicating a status of the image forming data obtained by the obtaining unit. The cloud server includes a control unit that sends the image forming data to the image forming apparatus and receives the information indicating the status of the image forming data, and a storing unit that stores the information indicating the status of the image forming data received by the controller.

According to an aspect of the present invention, it is possible to recognize the status in which job processing is disabled, by checking a job queue.

BRIEF DESCRIPTION OF THE DRAWINGS

In the attached drawings:

FIG. 3 is a schematic diagram showing a first example of print-queue management information in the embodiment 1;

FIG. 11 is a schematic diagram showing an example of a second message body in the embodiment 1;

FIG. 12 is a schematic diagram showing an example of a third message body in the embodiment 1;

FIG. 14 is a schematic diagram showing a second example of the print-queue management information in the embodiment 1;

FIG. 16 is a schematic diagram showing an example of updated printer management information in the embodiment 1;

FIG. 17 is a schematic diagram showing an example of a fourth message body in the embodiment 1;

FIG. 18 is a schematic diagram showing an example of updated print-job management information in the embodiment 1;

FIG. 19 is a schematic diagram showing an example of a fifth message body in the embodiment 1;

DETAILED DESCRIPTION OF THE INVENTION

Figure 1:
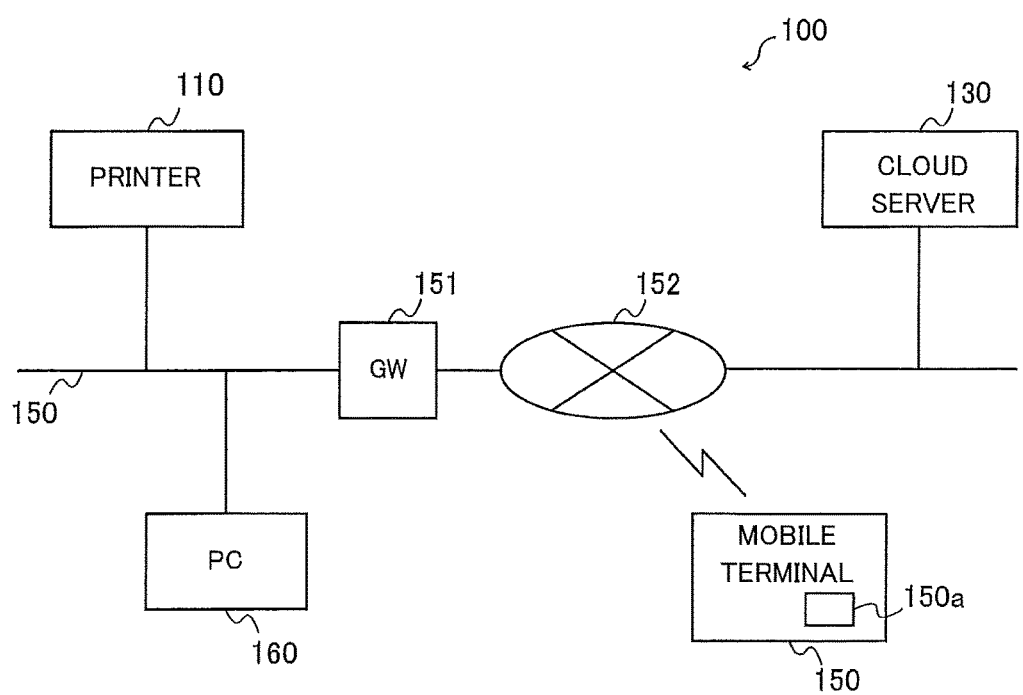
FIG. 1 is a schematic diagram of a printing system according to the embodiment 1.

An embodiment of the invention will now be described with reference to the attached drawings, in which like elements are indicated by like reference characters.

Embodiment 1

(Explanation of Configuration)

FIG. 1 is a schematic diagram showing a printing system 100 as an image forming system according to the embodiment 1.

The printing system 100 includes a printer 110 as an image forming apparatus and a cloud server 130.

The printer 110 is connected to a LAN 150 and can access the Internet 152 through a gateway (GW) 151. The cloud server 130 is connected to the Internet 152. Thus, the printer 110 and the cloud server 130 are capable of performing communication with each other.

A mobile terminal 150 as an information processing device is also connected to the Internet 152. The mobile terminal 150 can cause the printer 110 to perform printing (image forming), by sending a print job (an image forming job) to the cloud server 130. The print job is print data (image forming data) which include image data to print (form an image).

A PC 160 is connected to the LAN 150. The PC 160 can cause the printer 110 to perform printing, by sending a print job to the printer 110.

To the printer 110 and the cloud server 130, A host names as device identification information for identifying them are assigned. The host name of the printer 110 is 'printer1.example.com'. The host name of the cloud server 130 is 'print.cloud.com'.

Figure 2:
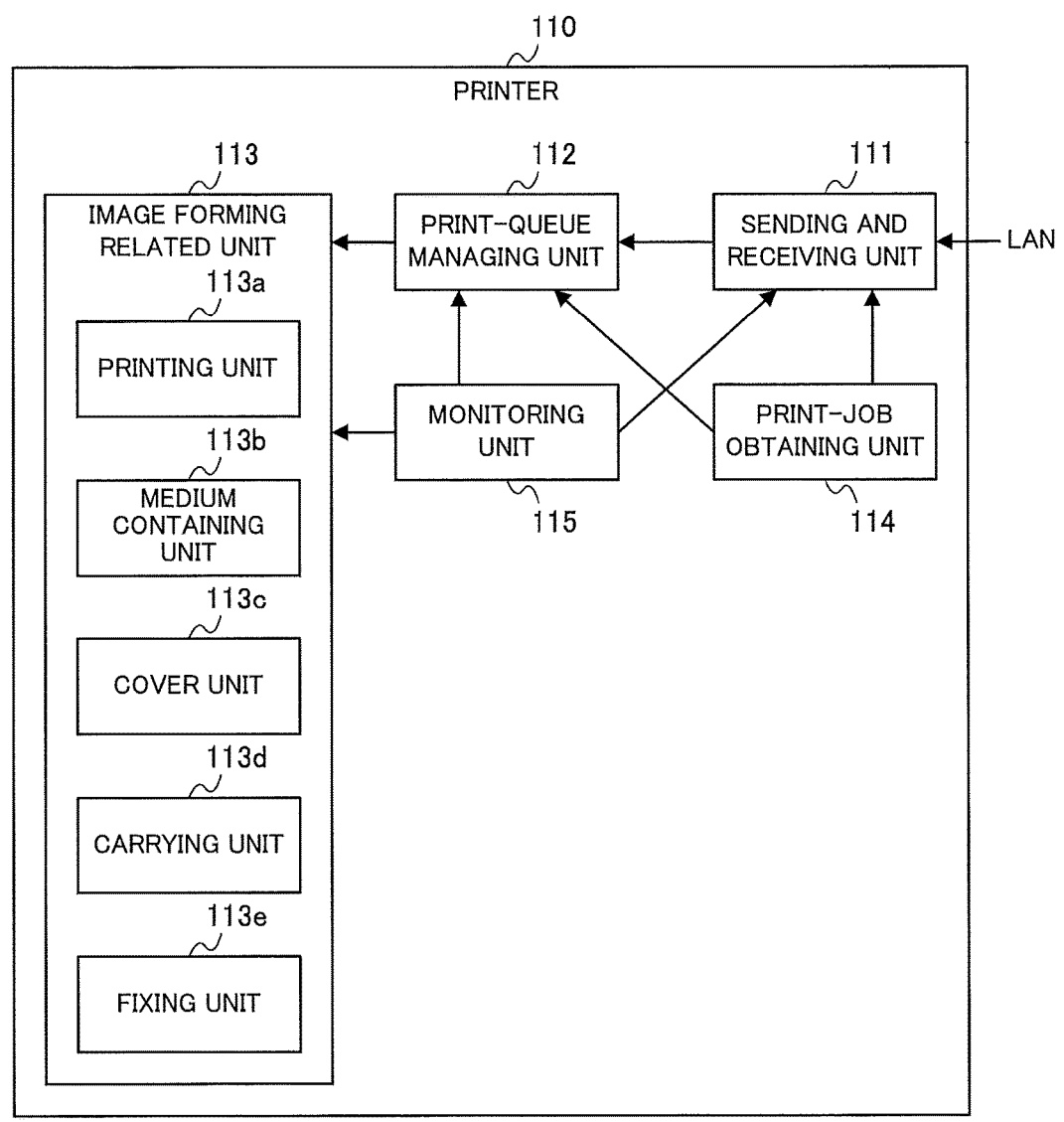
FIG. 2 is a block diagram schematically showing a configuration of a printer in the embodiment 1.

FIG. 2 is a block diagram schematically showing a configuration of the printer 110.

The printer 110 includes a sending and receiving unit 111, a print-queue managing unit 112, an image forming related unit 113, a print-job obtaining unit 114 as an image-forming-job obtaining unit, and a monitoring unit 115.

The sending and receiving unit 111 is connected to the LAN 150 and sends and receives data. The sending and receiving unit 111 is a network interface card (NIC), for example.

The print-queue managing unit 112 manages a print queue (an image forming queue) of print jobs which are received by the printer 110. The print-queue managing unit 112 is a storing unit for storing the print jobs received by the printer 110 and print-queue management information (image-forming-queue management information) for managing a processing order of the print jobs, statuses of the print jobs and the like, for example. The print-queue managing unit 112 is a nonvolatile memory, for example.

The image forming related unit 113 is a unit carrying out processing related to image forming according to image data included in the received print job.

The image forming related unit 113 includes a printing unit 113a, a medium containing unit 113b, a cover unit 113c, a carrying unit 113d, and a fixing unit 113e, for example.

The printing unit 113a is an image forming unit for performing printing on a medium according to the image data included in the received print job.

The medium containing unit 113b accommodates a medium on which an image is formed.

The cover unit 113c is a cover for accessing the inside of the printer 110.

The carrying unit 113d carries the medium accommodated in the medium containing unit 113b to the printing unit 113a.

The fixing unit 113e fixes an image printed at the printing unit 113a.

The print-job obtaining unit 114 obtains a print job through the sending and receiving unit 111. The print-job obtaining unit 114 obtains a print job from the cloud server 130 or the PC 160 through the sending and receiving unit 111, for example. The print-job obtaining unit 114 causes the print-queue managing unit 112 to store the obtained print job, and holds information relating to the obtained print job in the print-queue management information stored in the print-queue managing unit 112.

The monitoring unit 115 monitors the image forming related unit 113 and the print-queue managing unit 112 to control them. The monitoring unit 115 monitors the image forming related unit 113 and then detects that an error in relation to printing occurs, for example. Then, the monitoring unit 115 updates the print-queue management information stored in the print-queue managing unit 112, on the basis of the detected error. Moreover, the monitoring unit 115 notifies the cloud server 130 of status information on the status of the image forming related unit 113, as status information on the status of the print job which is obtained from the cloud server 130, through the sending and receiving unit 111. The status information on the status of the image forming related unit 113 may indicate the result of monitoring the image forming related unit 113, or the status of the image forming related unit 113 which can be specified from the result of monitoring the image forming related unit 113.

Here, the print-job obtaining unit 114 and the monitoring unit 115 can be implemented by a CPU (Central Processing Unit) that reads out a necessary program from an external memory device such as a nonvolatile memory, stores the program in a volatile memory, and executes the program. However, the print-job obtaining unit 114 and the monitoring unit 115 are not limited to the means of using software on a computer system. These units may be implemented by hardware using a high-density logic IC, such as ASIC (Application Specific Integrated Circuits) or FPGA (Field Programmable Gate Array), for example. Alternatively, these units may be implemented by means using software, such as a DSP (Digital Signal Processor).

FIG. 3 is a schematic diagram showing a first example of the print-queue management information stored in the print-queue managing unit 112.

As shown in FIG. 3, the print-queue management information 170 is information including an order column 170a, a status column 170b, a type column 170c, a document name column 170d, and a job ID column 170e in a table form.

The order column 170a stores an order of processing the print jobs. The order may be an order of receiving the print jobs, or may be determined in order of the priority of the print jobs, for example.

The status column 170b stores statuses of the print jobs.

The type column 170c stores types of the print jobs. The types are set so as to differentiate at least a print job received via the cloud server 130, from a print job which is not a print job received via the cloud server 130. In this embodiment, for example, 'cloud printing' type indicates print jobs which are received via the cloud server 130, and the other types indicate print jobs which are not received via the cloud server 130. 'PC printing' type indicates print jobs which are received from the PC 160 connected to the LAN 150.

The document name column 170d stores document names as document identification information for identifying documents as image data included in the print jobs.

The job ID column 170e stores job IDs as print-job identification information (image-forming-job identification information) for identifying the print jobs.

The print-queue management information 170 shown in FIG. 3, indicates that the four print jobs remain in the print queue. As shown in FIG. 3, the print job of the order number '1' is at the top of the print queue and is currently printed; the print jobs of the order numbers '2' to '4' remain in the print queue and are waiting to be printed.

Figure 4:
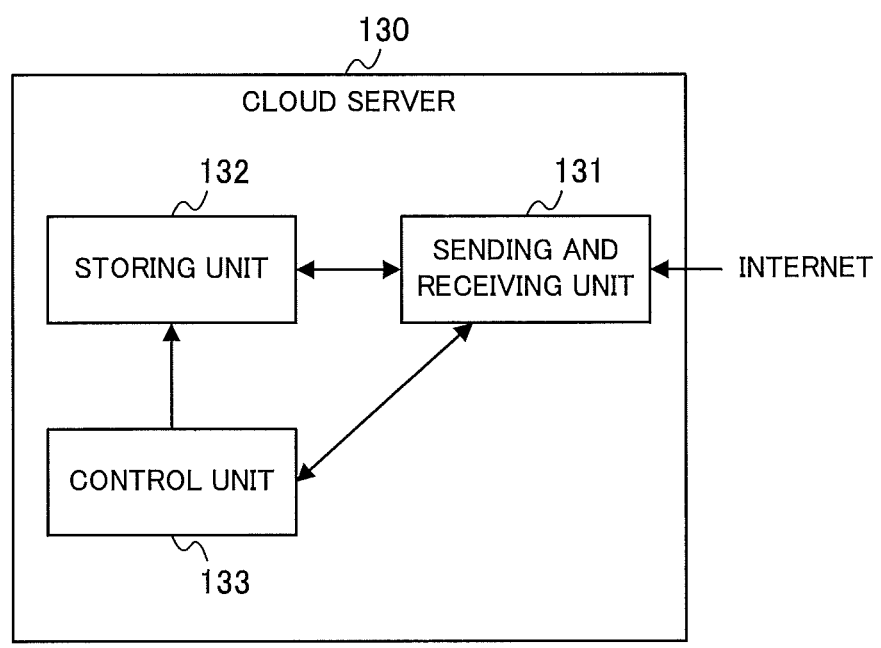
FIG. 4 is a block diagram schematically showing a configuration of a cloud server in the embodiment 1.

FIG. 4 is a block diagram schematically showing a configuration of the cloud server 130.

The cloud server 130 includes a sending and receiving unit 131, a storing unit 132, and a control unit 133.

The sending and receiving unit 131 is connected to the Internet 152 and sends and receives data. The sending and receiving unit 131 is a network card, for example.

The storing unit 132 stores information necessary for processing in the cloud server 130. For example, the storing unit 132 stores information necessary for managing a print job queue (image-forming-job queue) in a cloud printing service (a cloud image forming service). Specifically, the storing unit 132 stores print jobs, printer management information (image-forming-apparatus management information), and print-job management information (image-forming-job management information). The printer management information is information for managing the status of the printer 110 which the cloud server 130 can cause to perform printing. The print-job management information is information for managing print jobs to be printed by the printer 110.

The control unit 133 controls processing in the cloud server 130. For example, the control unit 133 causes the storing unit 132 to store a print job obtained through the sending and receiving unit 131, and holds information necessary for managing the print job in the print-job management information. Moreover, the control unit 133 sends the print job stored in the storing unit 132 to the printer 110 through the sending and receiving unit 131, obtains from the printer 110 information indicating the status of the printer 110 and information indicating the status of the print job, and then updates the printer management information and the print-job management information.

Figure 5:
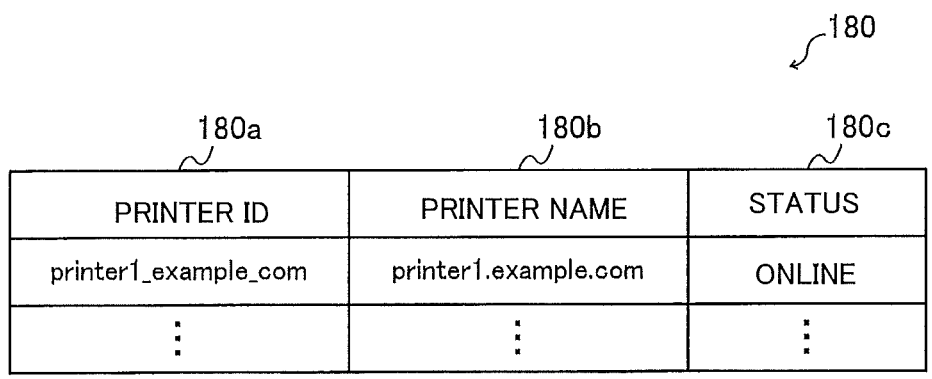
FIG. 5 is a schematic diagram showing an example of printer management information in the embodiment 1.

FIG. 5 is a schematic diagram showing an example of the printer management information.

As shown in FIG. 5, printer management information 180 is information including a printer ID column 180a, a printer name column 180b, and a status column 180c in a table form.

The printer ID column 180a stores printer IDs as first printer identification information for identifying a printer capable of printing through the cloud server 130.

The printer name column 180b stores printer names as second printer identification information for identifying a printer capable of printing through the cloud server 130.

The status column 180c stores the status of a printer capable of printing through the cloud server 130.

Figure 6:
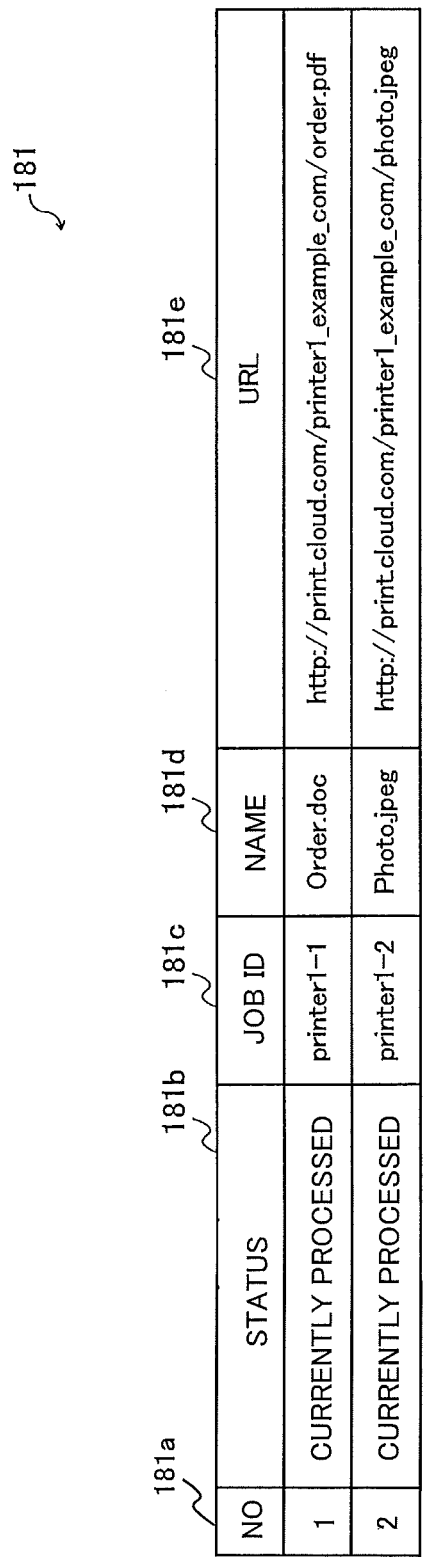
FIG. 6 is a schematic diagram showing an example of print-job management information in the embodiment 1.

FIG. 6 is a schematic diagram showing an example of the print-job management information.

As shown in FIG. 6, print-job management information 181 is information including a number (No) column 181a, a status column 181b, a job ID column 181c, a name column 181d, and a URL column 181e in a table form.

The number column 181a stores the numbers of an order of processing the print jobs. The order may be an order of receiving the print jobs, or may be determined in order of priority of the print jobs, for example.

The status column 181b stores statuses of the print jobs.

The job ID column 181c stores job IDs for identifying the print jobs.

The name column 181d stores document names of documents included in the print jobs.

The URL column 181e stores URLs for obtaining documents included in the print jobs.

The cloud server 130 described above can be implemented by a commonly-used computer that includes a CPU, a memory, an external memory device such as an HDD (Hard Disk Drive), a reading/writing device for reading/writing information from/into a removable storage medium such as a CD (Compact Disk) and a DVD (Digital Versatile Disk), and a communication device, such as an NIC, for connecting to a communication network.

For example, the sending and receiving unit 131 can be implemented in a way that the CPU uses the communication device; the storing unit 132 can be implemented in a way that the CPU uses the memory or the external memory device; the control unit 133 can be implemented in a way that the CPU loads predetermined programs from the external memory device to the memory and executes the loaded program. The predetermined programs may be downloaded to the external memory device, from the storage medium through the reading/writing device, or from a network through the communication device, and then may be loaded onto the memory and executed by the CPU. Alternatively, the predetermined programs may be loaded directly onto the memory, from the storage medium through the reading/writing device or from the network through the communication device, and then may be executed by the CPU.

As shown in FIG. 1, the mobile terminal 150 includes a display unit 150a such as a display for displaying a screen. The mobile terminal 150 further includes a wireless communication unit which can access the Internet 152, a control unit such as a CPU which performs processing, and an input unit for inputting instructions. These units are not shown in the drawings. The mobile terminal 150 can be configured by a mobile phone, for example.

A user of the mobile terminal 150 can input instructions through the input unit to send print jobs to the cloud server 130, and get the printer 110 to print.

The PC 160 is an information processing device that includes a sending and receiving unit which is connectable to the LAN 150, a control unit such as a CPU which performs processing, and an input unit for inputting instructions. These units are not shown in the drawings.

A user of the PC 160 can input instructions through the input unit to send print jobs to the printer 110, and can get the printer 110 to print.

(Explanation of Operation)

Figure 7:
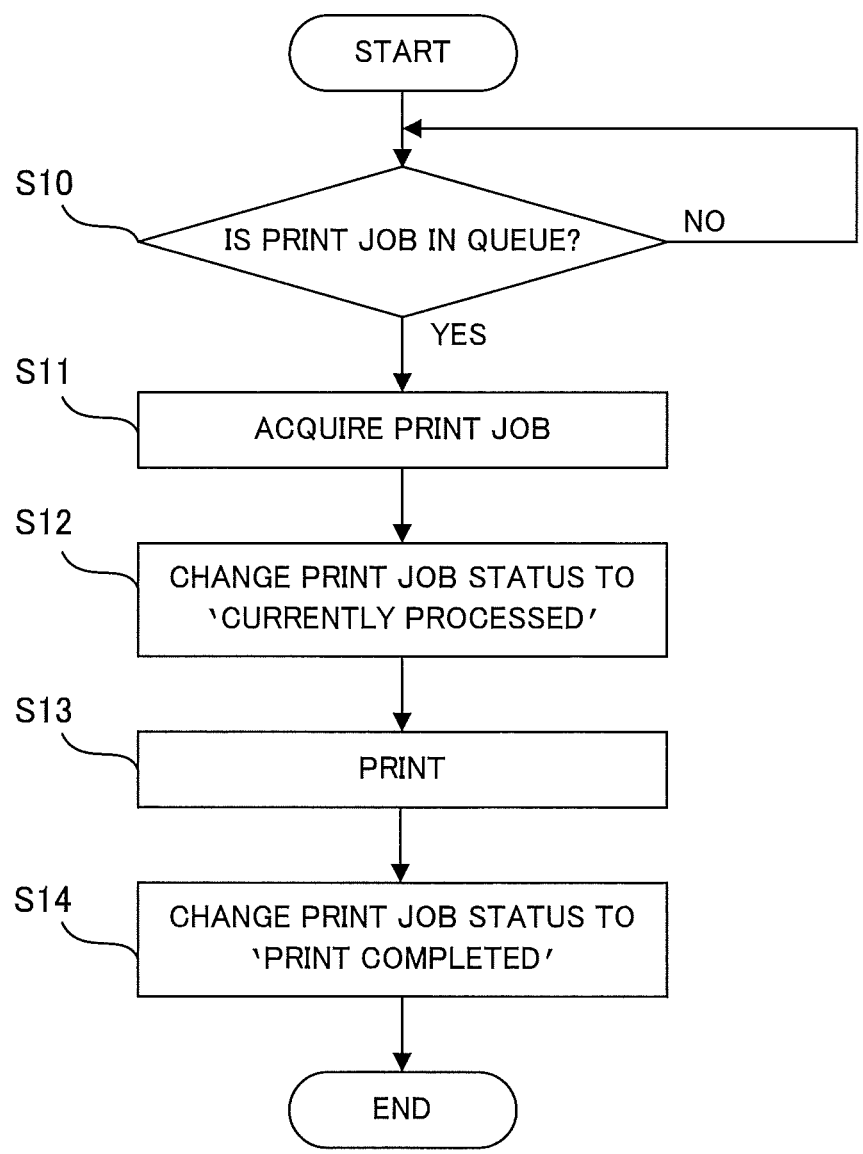
FIG. 7 is a flowchart showing processing when the printer performs printing through a cloud printing service in the embodiment 1.

FIG. 7 is a flowchart showing processing when the printer 110 performs printing in a cloud printing service.

First, the print-job obtaining unit 114 of the printer 110 checks whether there is any print job in a print job queue in the cloud server 130 (step S10). If there is no print job in the print job queue ('No' in step S10), the print-job obtaining unit 114 checks the print job queue again after a while.

If there is any print job in the print job queue ('Yes' in step S10), the print-job obtaining unit 114 obtains a print job (step S11). Then, the print-job obtaining unit 114 stores the obtained print job in the print-queue managing unit 112 and holds necessary information in the print-queue management information 170.

The monitoring unit 115 of the printer 110 accesses the cloud server 130 through the sending and receiving unit 111 and changes the status of the print job managed in the print-job management information 181 stored in the storing unit 132 of the cloud server 130 to 'currently processed' (step S12).

Then, by referring to the print-queue management information 170 stored in the print-queue managing unit 112, the monitoring unit 115 causes the image forming related unit 113 to print the print job which is changed to be printable (step S13).

Detecting the completion of the printing by the image forming related unit 113, the monitoring unit 115 accesses the cloud server 130 through the sending and receiving unit 111 and changes the status of the print job managed in the print-job management information 181 in the cloud server 130 to 'print completed' (step S14).

Figure 8:
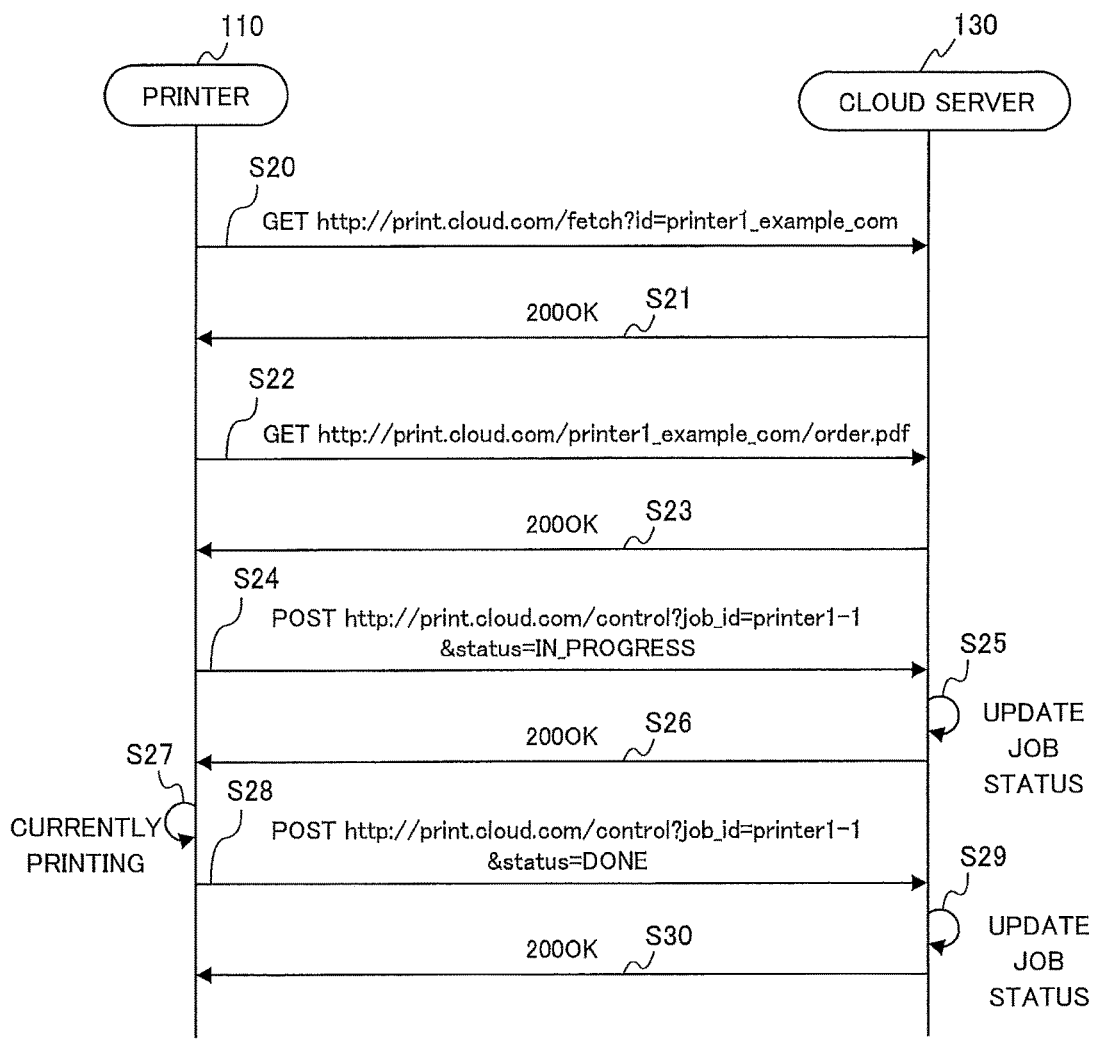
FIG. 8 is a sequence diagram showing communication between the printer and the cloud server when cloud printing is performed in the embodiment 1.

FIG. 8 is a sequence diagram showing communication between the printer 110 and the cloud server 130 when cloud printing (cloud image forming) is performed.

The print-job obtaining unit 114 of the printer 110 accesses the cloud server 130 according to HTTP (Hyper Text Transfer Protocol). First, the print-job obtaining unit 114 inquires whether there is any print job in a print job queue for the printer 110 in the cloud server 130. The print-job obtaining unit 114 sends an GET request of an HTTP command to an URL of the print job queue for the printer 110 'http://print.cloud.com/fetch?id=printer1_example_com', for example (S20).

If there is any print job in the print job queue for the printer 110, in other words, if any print job is managed in the print-job management information 181 concerning the printer 110, the control unit 133 of the cloud server 130 responds the presence of a print job in the print job queue, the job ID of the print job (printer1-1), the status of the print job in the print job queue (QUEUED: waiting print processing), and a URL indicating location of the print job (http://print.cloud.com/printer1_example_com/order.pdf) along with a '200 OK' response (S21). For example, the control unit 133 sends to the printer 110 the '200 OK' response containing the data shown in FIG. 9 in its message body.

According to the URL indicating the location of the print job in the response from the cloud server 130, the print-job obtaining unit 114 of the printer 110 sends an GET request of an HTTP command to the URL (http://print.cloud.com/printer1_example_com/order.pdf) (S22).

The control unit 133 of the cloud server 130 sends a '200 OK' response and data of the print job to the GET command (S23).

The print-job obtaining unit 114 of the printer 110 obtains the print job through the sending and receiving unit 111 and then sends an HTTP POST command to the cloud server 130 for requesting to change the status of the print job to 'currently processed' (S24). For example, the request is 'http://print.cloud.com/control?job_id=printer1-1&status=IN_PROGRESS'.

When the cloud server 130 receives the request, the control unit 133 changes the status corresponding to the job ID 'printer1-1' in the print-job management information 181 concerning the printer 110 stored in the storing unit 132, to 'currently processed' (S25). If the change is successful, the control unit 133 returns a '200 OK' response through the sending and receiving unit 131 (S26).

Then, the image forming related unit 113 of the printer 110 performs printing according to the received print job (S27).

When the printing is completed, the monitoring unit 115 of the printer 110 sends an HTTP POST command to the cloud server 130 through the sending and receiving unit 111 for requesting to change the status of the print job to 'print completed' (S28). For example, the request is 'http://print.cloud.com/control?job_id=printer1-1&status=DONE'.

When the cloud server 130 receives the request, the control unit 133 changes the status corresponding to the job ID 'printer1-1' in the print-job management information 181 concerning the printer 110 stored in the storing unit 132, to 'print completed' (S29). If the change is successful, the control unit 133 returns a '200 OK' response through the sending and receiving unit 131 (S30).

Figures 9, 10:
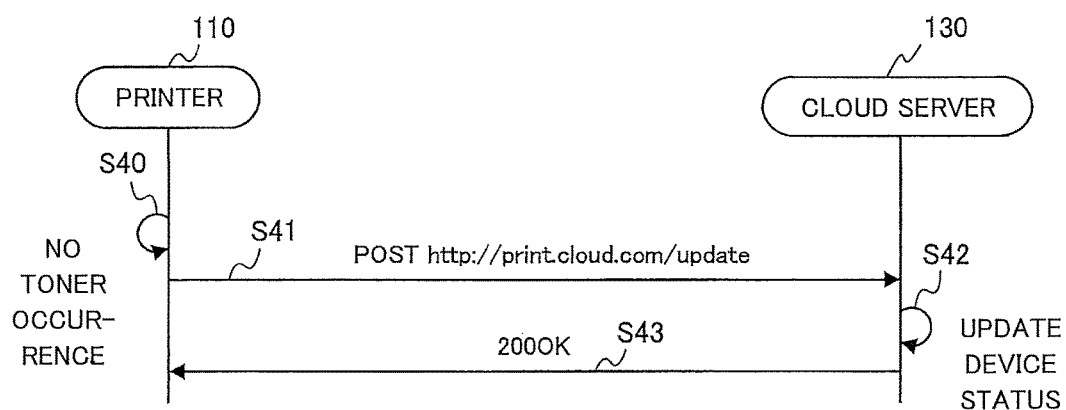
FIG. 9 is a schematic diagram showing an example of a first message body in the embodiment 1.
FIG. 10 is a sequence diagram showing communication performed to notify a cloud server that an error occurs in the printer, in a conventional cloud printing service.

FIG. 10 is a sequence diagram showing communication between the printer 110 and the cloud server 130 when an error occurs in the printer 110. FIG. 10 shows an example of communication in a conventional cloud printing service.

When a 'no toner' error occurs in the printer 110 (S40), the monitoring unit 115 of the printer 110 sends an HTTP POST command to the cloud server 130 for requesting to change the status of the printer 110 to 'stopped' (S41). For example, the monitoring unit 115 sends, to the cloud server 130, a request message containing 'http://print.cloud.com/update' in its header and data shown in FIG. 11 in its message body. The data shown in FIG. 11 indicate the printer ID (printer1_example_com), that the printer is stopped (STOPPED), and that black toner is exhausted (black, EXHAUSTED).

When the cloud server 130 receives the POST command, the control unit 133 changes the status corresponding to the printer ID 'printer1_example_com' in the printer management information 180 stored in the storing unit 132, to 'stopped' (S42).

Then, if the status of the printer 110 is successfully updated exactly as the content of the received POST command, the control unit 133 of the cloud server 130 sends to the printer 110 a '200 OK' response and data shown in FIG. 12 in its message body (S43).

Figures 13A, 13B:
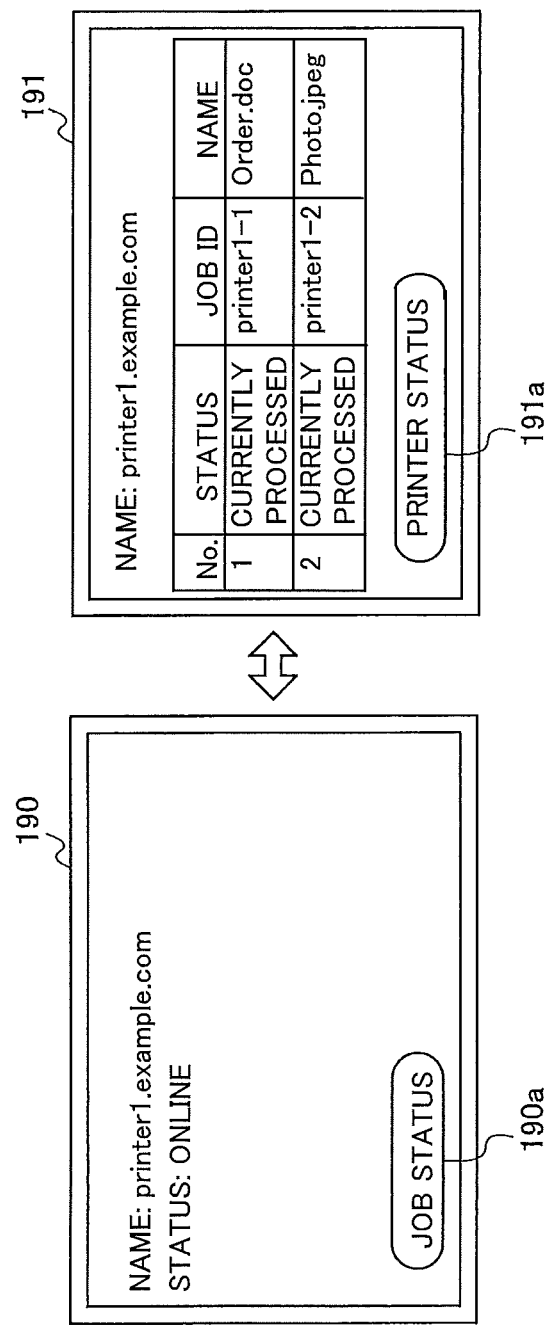
FIGS. 13(A) and 13(B) are schematic diagrams showing an example of UI screens in the conventional cloud printing service.

FIGS. 13(A) and 13(B) are schematic diagrams showing an example of UI (User Interface) screens displayed on the display unit 150a of the mobile terminal 150. Screens 190 and 191 shown in FIGS. 13(A) and 13(B) can be obtained by using a Web browser or the like to make the mobile terminal 150 access the cloud server 130.

The screen 190 shown in FIG. 13(A) displays the status of the printer 110. As shown in FIG. 13(A), the screen 190 displays the printer name 'printer1.example.com' which is the domain name of the printer 110. The screen also displays the status of the printer 110 as 'online' (normal). The control unit 133 of the cloud server 130 generates screen data for displaying the screen 190 on the basis of the printer management information 180 stored in the storing unit 132, and sends the generated screen data to the mobile terminal 150. If a 'job status' button 190a on the screen 190 is pressed, the screen 191 shown in FIG. 13(B) is displayed.

The screen 191 shown in FIG. 13(B) displays the statuses of print jobs in a print job queue in the cloud server 130. The print jobs displayed on the screen do not correspond to the print jobs managed by the print-queue managing unit 112 of the printer 110. Among the print jobs managed by the print-queue managing unit 112 of the printer 110, print jobs of which print instructions are received through the cloud server 130 are displayed on the screen 191.

The screen 191 shown in FIG. 13(B) displays the statuses of the print jobs whose names (document names) are 'Oder.doc' and 'Photo.jpeg'. The control unit 133 of the cloud server 130 generates screen data for displaying the screen 191 on the basis of the print-job management information 181 stored in the storing unit 132, and sends the generated screen data to the mobile terminal 150. If a 'printer status' button 191a on the screen 191 is pressed, the screen 190 shown in FIG. 13(A) is displayed.

FIG. 14 is a schematic diagram showing a second example of the print-queue management information stored in the print-queue managing unit 112 of the printer 110.

Print-queue management information 170# shown in FIG. 14 is an example of information when a 'no toner' error occurs in the printer 110.

FIG. 14 shows that a print job of the order number '1' is at the top of the print queue and printing of the print job is stopped because toner is exhausted in the printer 110.

FIG. 14 also shows that print jobs of the order numbers '2' to '4' remain in the print queue and the print jobs are waiting to be printed. As shown in FIG. 14, although printing of the print job which is currently printed (i.e., the print job at the top) is stopped, the subsequent print jobs are still waiting to be printed.

Thus, even if checking the UI screen prepared in the cloud server 130 for the statuses of the print jobs of the order numbers '2' and '3' of which print instructions are received via the cloud, the user cannot find that the printing is stopped independently of the cloud print jobs. In the embodiment, such a problem is solved. An example of communication in the embodiment will be explained by referring to FIG. 15.

Figure 15:
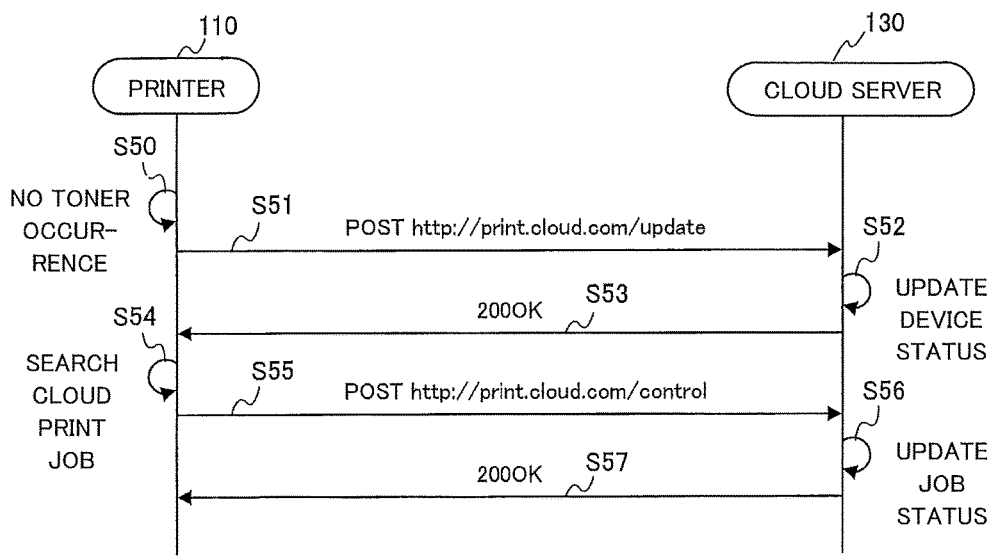
FIG. 15 is a sequence diagram showing communication performed to notify the cloud server that an error occurs in the printer, in the embodiment 1.

FIG. 15 is a sequence diagram showing communication between the printer 110 and the cloud server 130 to notify the cloud server 130 that an error occurs in the printer 110 in the embodiment 1.

When a 'no toner' error occurs in the printer 110 (S50), the monitoring unit 115 of the printer 110 sends an HTTP POST command to the cloud server 130 for requesting to change the status of the printer 110 to 'stopped' (S51). The request includes 'http://print.cloud.com/update' in its header and the data shown in FIG. 11 in its message body, for example.

When the cloud server 130 receives the POST command, the control unit 133 changes the status corresponding to printer ID 'printer1_example_com' in the printer management information 180 stored in the storing unit 132, to 'stopped' (S52). For example, as shown in printer management information 180# in FIG. 16, the control unit 133 updates the status corresponding to the printer ID 'printer1_example_com' to 'stopped (no toner)'. Here, the control unit 133 specifies 'no toner' as the cause of the stop of the printer 110 from the data shown in FIG. 11, and holds this information in the printer management information 180#, but this scheme is exemplary and not limiting.

Then, if the status of the printer 110 is updated exactly as the content of the received POST command, the control unit 133 of the cloud server 130 sends to the printer 110 an HTTP response with status code '200 OK' and the data shown in FIG. 12 in its message body (S53).

Next, the monitoring unit 115 of the printer 110 checks the print-queue management information 170 stored in the print-queue managing unit 112, and searches for a print job of 'cloud printing' type (S54). In the example shown in FIG. 3, the print jobs of the order numbers '2' and '3' are the print jobs of the 'cloud printing' type. The monitoring unit 115 sends an HTTP POST command to the cloud server 130 for requesting to change the statuses of these print jobs to 'stopped' on the cloud server 130 (S55). The request includes 'http://print.cloud.com/control' in its header and data shown in FIG. 17 in its message body, for example.

The data shown in FIG. 17 indicate job IDs (printer1-1 and printer1-2), stopped status of the processing of the print jobs (STOPPED), and the occurrence of an error in relation to toner ("device_state_cause": {"error_code": "MARKER"}). Here, the 'stopped' status which is to be notified is the same as the status of the print job of the order number '1' shown in FIG. 14, i.e., the status where an error occurs during its execution.

When the cloud server 130 receives the POST command, the control unit 133 changes to 'stopped' the statuses corresponding to the job IDs 'printer1-1' and 'printer1-2', in the print-job management information 181 stored in the storing unit 132 (S56). For example, as shown in print-job management information 181# in FIG. 18, the control unit 133 updates the statuses corresponding to the job IDs 'printer1-1' and 'printer1-2' to 'stopped (toner)'. Here, the control unit 133 specifies 'toner' as the cause of the stop of the printing of the print jobs from the data shown in FIG. 17, and holds this information in the print-job management information 181#, but this scheme is exemplary and not limiting.

Then, if the statuses of the print jobs are updated exactly as the content of the received POST command, the control unit 133 of the cloud server 130 sends to the printer 110 a '200 OK' response and data shown in FIG. 19 in its message body (S57).

Figures 20A, 20B:
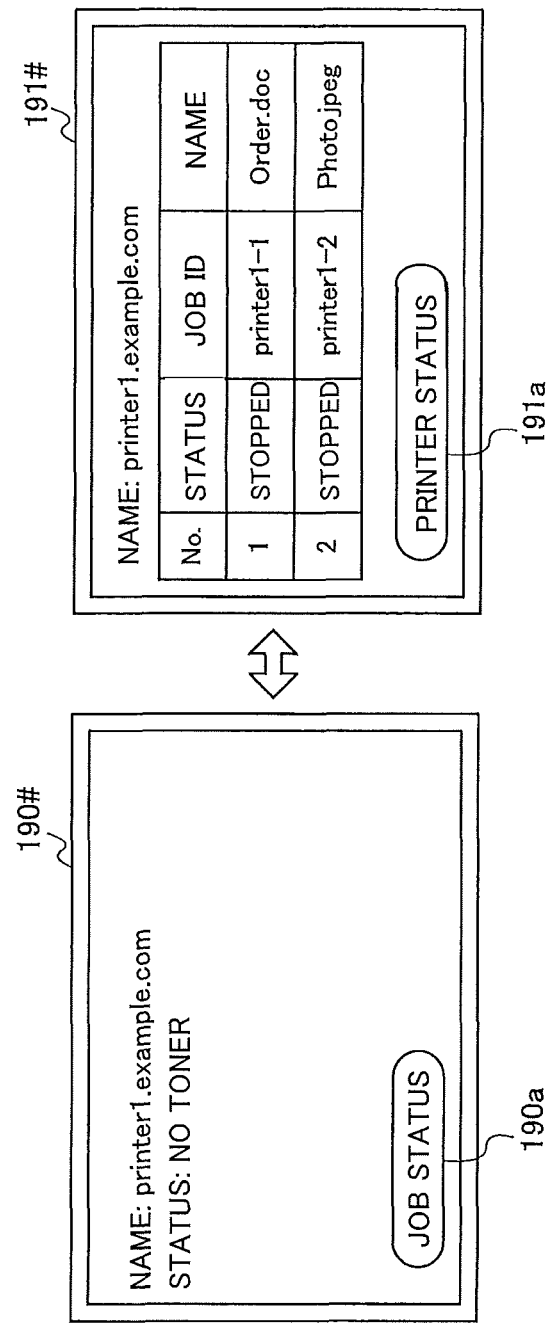
FIGS. 20(A) and 20(B) are schematic diagrams showing an example of UI screens in the embodiment 1.

FIGS. 20(A) and 20(B) are schematic diagrams showing an example of UI screens displayed on the display unit 150a of the mobile terminal 150 after the communication shown in FIG. 15 is performed. Screens 190# and 191# shown in FIGS. 20(A) and 20(B) can be obtained by using a Web browser or the like to make the mobile terminal 150 access the cloud server 130.

The screen 190# shown in FIG. 20(A) displays the status of the printer 110. As shown in FIG. 20(A), the screen 190# displays the printer name 'printer1.example.com' which is the domain name of the printer 110. The screen also displays the status of the printer 110 as 'no toner'. The control unit 133 of the cloud server 130 generates screen data for displaying the screen 190# on the basis of the printer management information 180# stored in the storing unit 132, and sends the generated screen data to the mobile terminal 150. Although the cause of the stop of the printer 110, i.e., 'no toner', is displayed in this example, the status of the printer 110, i.e., 'stopped', may be displayed. If 'job status' button 190a on the screen 190# is pressed, the screen 191# shown in FIG. 20(B) is displayed.

The screen 191# shown in FIG. 20(B) displays the statuses of the print jobs in the print job queue in the cloud server 130. The print jobs displayed on the screen do not correspond to the print jobs managed by the print-queue managing unit 112 of the printer 110. Among the print jobs managed by the print-queue managing unit 112 of the printer 110, the print jobs of which print instructions are received via the cloud server 130 are displayed on the screen 191#.

The screen 191# shown in FIG. 20(B) displays the statuses of the print jobs whose names (document names) are 'Oder.doc' and 'Photo.jpeg'. The control unit 133 of the cloud server 130 generates screen data for displaying the screen 191# on the basis of the print-job management information 181# stored in the storing unit 132, and sends the generated screen data to the mobile terminal 150. Although the status of the print job, i.e., 'stopped', is displayed in this example, the cause of the stop, i.e., 'toner', may be also displayed. If a 'printer status' button 191*a* on the screen 191# is pressed, the screen 190# shown in FIG. 20(A) is displayed.

In the example of FIGS. 20(A) and 20(B), unlike the case of FIGS. 13(A) and 13(B), the user can see that the status of the print job is 'stopped'. With displaying the UI screens, even if checking the print job queue in the cloud server 130 from the mobile terminal 150 or the like, the user can see that the printing is stopped.

Figure 21:
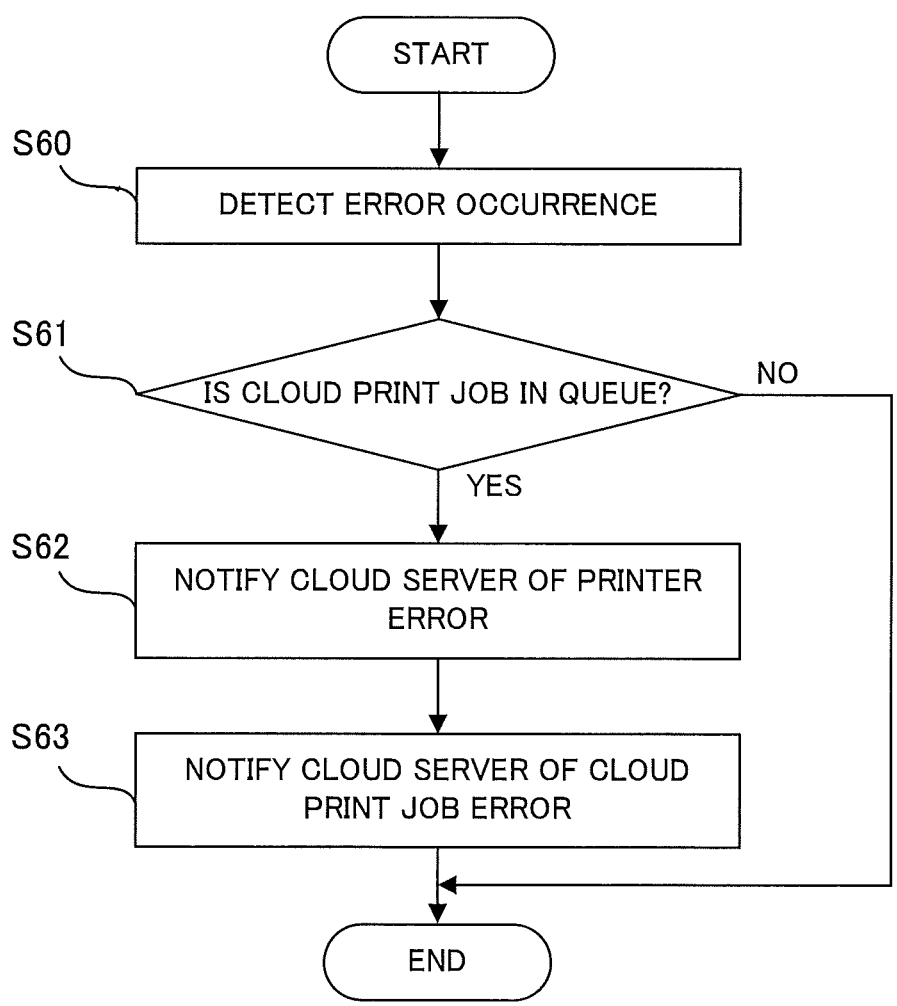
FIG. 21 is a flowchart showing processing in the printer when an error occurs in the embodiment 1.

FIG. 21 is a flowchart showing processing in the printer 110 when an error occurs.

When an error occurs in the printer 110, the monitoring unit 115 detects the error (S60).

The monitoring unit 115 judges whether or not there is any cloud print job for cloud printing in a print queue (S61). For example, the monitoring unit 115 checks the print-queue management information 170 stored in the print-queue managing unit 112. If there is any print job of 'cloud printing' type, it is judged that there is any cloud print job in the print queue. If there is any cloud print job in the print queue ('Yes' in step S61), the processing proceeds to step S62. If there is no cloud print job in the print queue ('No' in step S61), the processing ends.

In step S62, the monitoring unit 115 notifies the cloud server 130 that the status of the printer 110 is 'stopped'.

Then, the monitoring unit 115 notifies the cloud server 130 that the status of the print job is 'stopped' (S63).

As described above, according to the embodiment 1, the user can find that the printer 110 is in a state where printing is disabled (stopped), even if he is not near the printer 110 and he checks the status of a print job on the cloud server 130 by remote control. Thus, it is possible for the user to recover the printer 110 to be in a printable state, and therefore an advantageous effect of improving the convenience of the printer 110 is achieved.

The printer 110 is connected to the Internet 152 through the LAN 150 in the embodiment 1, but this scheme is exemplary and not limiting. The similar function can be implemented even in other network configurations.

The notification 'stopped' is sent as the print job status information in the embodiment 1, but this scheme is exemplary and not limiting. The notification 'error occurs' may be sent as the print job status information, for example.

In the embodiment 1 described above, when an error occurs in the image forming related unit 113, the monitoring unit 115 of the printer 110 sends the notification that the image forming related unit 113 is stopped, as status information indicating the statuses of all cloud print jobs managed by the print-queue managing unit 112 of the printer 110, but this scheme is exemplary and not limiting.

The monitoring unit 115 may send that notification as status information on a print job which is first in the order, among the cloud print jobs managed by the print-queue managing unit 112, for example.

The print jobs may be managed for each user in the embodiment described above. For example, if print jobs sent from the cloud server 130 to the printer 110 are associated with user identification information such as user names for identifying a user having given print instructions, the print jobs can be managed in the printer 110 for each user.

In such a case, for example, when an error occurs in the image forming related unit 113, the monitoring unit 115 of the printer 110 may send that notification as status information on a print job which is first in the order on a user-by-user basis, out of cloud print jobs managed by the print-queue managing unit 112.

In the embodiment 1 above, the example in which the monitoring unit 115 monitors the status of the printing unit 113*a* and then detects the status ('no toner') is described, but this example is not limiting. The monitoring unit 115 may monitor the status of another unit of the image forming related unit 113 and notify the cloud server 130 of status information indicating the status. For example, the monitoring unit 115 may monitor whether or not a medium is accommodated in the medium containing unit 113*b* and notify the cloud server 130 of status information indicating that no medium is accommodated. As another example, the monitoring unit 115 may monitor whether the cover unit 113*c* is open or closed and notify the cloud server 130 of status information indicating that the cover unit 113*c* is open. As another example, the monitoring unit 115 may monitor whether a medium jam occurs at the carrying unit 113*d* and notify the cloud server 130 of status of the occurrence of the medium jam. As further another example, the monitoring unit 115 may monitor whether the fixing unit 113*e* has trouble or not and notify the cloud server 130 of status information indicating that the fixing unit 113*e* has trouble. As still another example, the monitoring unit 115 may monitor whether or not a component of the image forming related unit 113 reaches the end of the life and notify the cloud server 130 of status information indicating that the component reaches the end of the life.

In the embodiment 1, the printer 110 is described as an example of the image forming apparatus, but it is not limited to this example. The image forming apparatus may be other apparatuses, such as a photocopier, multifunction peripheral (MFP) and a facsimile machine.

What is claimed is:

1. An image forming apparatus comprising:
    an obtaining unit that obtains first image forming data from an information processing device not via a cloud server and second image forming data from the cloud server;
    an image forming related unit that is involved in image forming processing of the first image forming data and the second image forming data obtained by the obtaining unit; and
    a monitoring unit that monitors a status of processing of the first image forming data that is not received via the cloud server and the second image forming data, and, when the processing of the first image forming data that is not received via the cloud server is higher in a queue than a processing of the second image forming data and the processing of the first image forming data is subjected to an error, assigns an error status to the first image forming data and the second image forming data and notifies the cloud server of the error status of the second image forming data.

2. The image forming apparatus according to claim 1, wherein the error status indicates a stop of processing of the first image forming data.

3. The image forming apparatus according to claim 1, further comprising a storing unit that stores image forming data obtained by the obtaining unit, the image forming data being associated with an order of performing image forming processing of a plurality of image forming data, including the first and second image forming data, by the image forming related unit,
    wherein if the storing unit has stored therein the plurality of image forming data, including the second image forming data, which are obtained from the cloud server and of which image forming processing is not yet performed by the image forming related unit, and, when the processing of the first image forming data that is not received via the cloud server is higher in the queue than the processing of the plurality of image forming data which are obtained from the cloud server, and the processing of the first image forming data is subjected to the error, the monitoring unit assigns the error status to the plurality of image forming data and notifies the cloud server of the error status of the plurality of image forming data.

4. The image forming apparatus according to claim 1, further comprising a storing unit that stores image forming data obtained by the obtaining unit, the image forming data being stored in the queue associated with an order of performing image forming processing by the image forming related unit, wherein image forming data obtained by the obtaining unit from the cloud server are associated with user identification information for identifying a user having given instructions to perform image forming processing, if the storing unit has stored therein a plurality of image forming data, including the second image forming data, which is obtained from the cloud server and of which image processing is not yet performed by the image forming related unit, and, when the processing of the first image forming data that is not received via the cloud server is higher in the queue than the processing of the plurality of image forming data which are obtained from the cloud server, and the processing of the first image forming data is subjected to the error, the monitoring unit assigns the error status to the plurality of image forming data and notifies the cloud server of the error status of the plurality of image forming data.

5. An image forming apparatus comprising:

an obtaining unit that obtains first image forming data from an information processing device not via a cloud server and second image forming data from the cloud server;

a storing unit that stores the first image forming data and the second image forming data obtained by the obtaining unit;

an image forming related unit that executes, in order, image forming processing of the first image forming data and the second image forming data stored in the storing unit; and a monitoring unit that assigns an error status to the first image forming data and the second image forming data based on the first image forming data obtaining an error during processing, and the second image forming data being later than the first image forming data in an order of processing, and notifies the cloud server of the error status of the second image forming data.

6. An image forming system comprising an image forming apparatus, a cloud server, and an information processing device other than the cloud server, the image forming apparatus including:

an obtaining unit that obtains first image forming data from the information processing device not via the cloud server and second image forming data via the cloud server;

an image forming related unit that is involved in image forming processing of the first image forming data and the second image forming data obtained by the obtaining unit; and a monitoring unit that monitors a status of processing of the first image forming data and the second image forming data and, when the processing of the first image forming data that is not received via the cloud server is higher in a queue than a processing of the second image forming data and the processing of the first image forming data is subjected to an error, assigns an error status to the first image forming data and the second image forming data and notifies the cloud server of the error status of the second image forming data.

* * * * *